Nov. 18, 1952     J. M. MILLS, JR., ET AL     2,618,564
FROZEN PRUNE PROCESS
Filed July 10, 1950
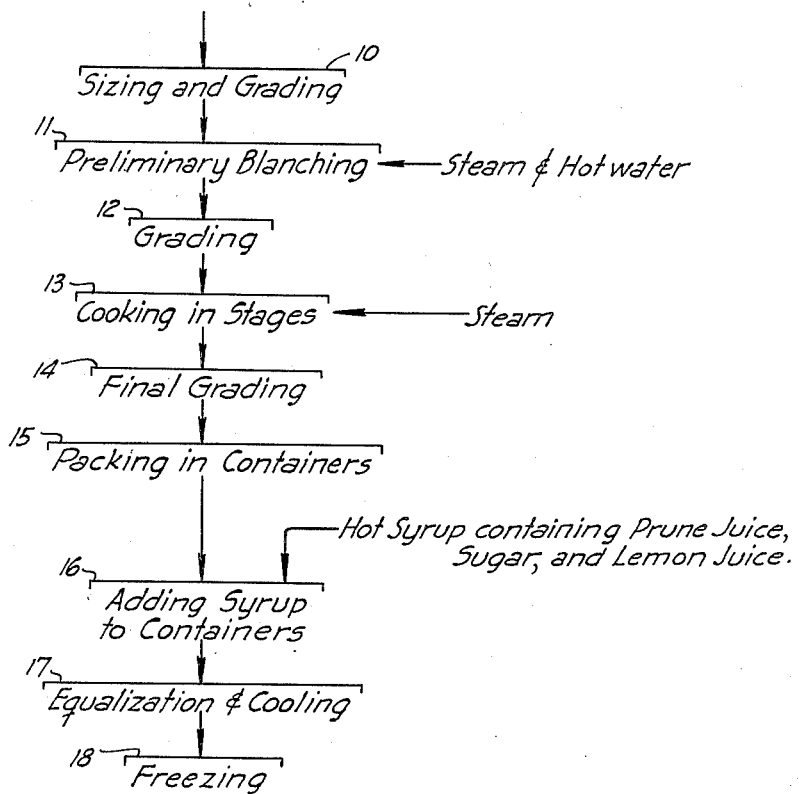
INVENTORS
James M. Mills, Jr.
BY James M. Mills, III.
ATTORNEYS Patented Nov. 18, 1952

2,618,564

UNITED STATES PATENT OFFICE 2,618,564

FROZEN PRUNE PROCESS

James M. Mills, Jr., and James M. Mills, III, Hamilton City, Calif.

Application July 10, 1950, Serial No. 172,936

5 Claims. (Cl. 99—193)

This invention relates generally to processes for the treatment of prunes to produce a marketable product in frozen condition.

Many processes have been developed for producing packaged and canned prunes in precooked form, whereby the consumer may make use of the product with little or no additional processing. The moisture content of packaged prunes must necessarily be less than that generally desired for consumption, and therefore irrespective of the degree to which the prunes have been cooked, some processing must be applied at the time of consumption to increase the moisture content. Both packaged and canned precooked prunes are lacking in high quality and optimum flavor characteristics. Some flavor impairment is caused by caramelization of the sugar content which takes place during processing. In addition there is a noticeable loss of the characteristic prune flavor, which appears to occur during various stages of the treatment. The syrup which is supplied with canned prunes also lacks desirable optimum flavor characteristics, and is cloudy rather than clear, due presumably to the presence of divided solids from the flesh.

Insofar as we are aware no effort has been made to produce precooked prunes in frozen form. Presumably the industry has assumed that frozen precooked prunes could not compete in price or quality with products now available in packaged or canned form.

In general it is an object of the present invention to produce a frozen precooked prune which is in condition for immediate use by the consumer, and which is of relatively high quality compared to other precooked prunes now on the market.

It is a further object of the invention to provide a novel process for the production of frozen prunes of the above character, and which process is characterized by treatment operations which do not cause sugar caramelization or other impairment of flavor characteristics, and which heightens the natural sweet and fruity flavor of the product.

Another object of the invention is to provide a process of the above character which can be carried out commercially without difficulty, and which will not require excessive processing machinery.

Another object of the invention is to provide a process of the above character which will provide a clear syrup of good flavor when the prunes are thawed.

Additional objects of the invention will appear from the following description in which the preferred embodiment has been set forth in detail.

In general the present invention involves preliminary preparation of dried (i. e. partially dehydrated) prunes as by steam cleaning and grading, after which they are subjected to a special treatment to cook the flesh and increase the moisture content, without detrimentally affecting the sugar content or flavor characteristics. This operation is carried out by contacting the prunes with an atmosphere of hot moisture saturated air, preferably in a plurality of stages, with each stage being at a higher temperature. The highest temperature employed is not in excess of about 212° F., thereby avoiding caramelization of the sugar content. During this treatment the prunes are made relatively tender and the moisture content is increased to a value suitable for the next step of the process. Following such cooking the prunes are immersed in a hot syrup comprising prune juice, sugar and lemon juice, and they are permitted to stand immersed in the syrup for a substantial period of time during which equalization of sugar takes place together with a further increase in moisture content. During this step a substantial amount of sugar from the syrup enters the prunes, and the specific gravity of the syrup is increased. After sugar equalization the entire mass is frozen to a low temperature, and the product is then in condition for marketing. Preferably the prunes are frozen in the same container into which the prunes are introduced and immersed in the syrup.

The flow sheet of the drawing illustrates a suitable procedure for carrying out the process. Thus good quality dried prunes are shown being subjected to conventional sizing and grading at 10, after which they are subjected to preliminary steam and hot water blanching 11. Such blanching is commonly employed in the processing of prunes, and it serves to clean the surfaces of the prunes, together with some cooking of the flesh, and some absorption of moisture. Initially the dried prunes may contain from 16 to 18% moisture, and after blanching at 11 the prunes may contain from about 23 to 25% moisture, 24% being optimum. Operation 11 can be carried out by the use of conventional combination steam and water blanching machines of the type now used in the industry for the cleaning and processing of prunes.

After operation 11 it is desirable to subject the prunes to further conventional selective grading at 12. The prunes are now passed to the cooking operation 13, which is preferably carried out in a plurality of stages. Good results have been secured by using three stages of cooking, with a higher temperature being used in each stage. In each stage the cooking is carried out by contacting the prunes with an atmosphere of air which is heated and saturated by direct introduction of steam into the same. By way of example the first cooking stage can be carried out with the saturated air at a temperature of 180° F. and continued for a period of ten minutes. The second stage can be carried out with the saturated air at 190° F. for a period of ten minutes. The third stage can be carried out at a temperature of 195° F., and continued for a period of thirteen minutes.

In each cooking stage the moisture content of the prunes is progressively increased. Thus in one typical operation of the process in which the above temperatures were employed, the prunes entering the first cooking stage contained 24% moisture, and in this stage the moisture content was increased to about 27.5%. In the second stage the moisture content was gradually increased to about 30%. In the third stage the moisture content was increased to a final 33.2%.

Throughout the cooking treatment at 13 care is taken to avoid temperatures sufficiently high to cause substantial caramelization of the sugar content. Thus all of the heat treatment in both operations 11 and 12 takes place at temperatures not in excess of 212° F.

Assuming use of temperatures, time factors, and moisture contents of the order described above, the pulp temperature of the prunes leaving the operation 13 is of the order of 165° F. The prunes are relatively tender at this point, and care must be taken during handling to avoid crushing or rupture of the skins.

One may deviate to some extent from the values of temperature, time and moisture content specified above. Thus the values of temperature in the three stages may be within ranges as follows: For the first stage 175 to 185° F., for the second stage from 185 to 193° F., and for the last stage from 193 to 200° F. Likewise there may be some deviation in the time values specified, provided care is taken to complete cooking without detrimental overcooking. Thus instead of the over-all optimum cooking period of 33 minutes, cooking can be continued for say 40 minutes. The greater part of the time increase should preferably be in the second rather than the last stage.

Deviations in temperature and time factors will generally result in some permissible deviations as to moisture content. Thus the moisture content of the prunes leaving the several stages may range from say 26 to 28% for the first stage, 29 to 31% for the second stage, and 32 to 35% for the third stage.

While we prefer to carry out the cooking in distinct stages as described above, it is possible to gradually increase the temperature in each stage to the point of eliminating any substantial temperature difference between the temperature at the end of one stage and inlet temperature of the next stage.

Following cooking at 13 it is desirable to subject the prunes to further grading at 14 to eliminate defectives.

The prunes are now packed in containers at 15, and preferably the same containers in which the prunes are to be marketed. For example we may use metal containers suitable for the marketing of frozen products. In the next operation 16 a hot syrup is added to the containers in sufficient amount to completely immerse the prunes. This syrup is one formed of prune juice together with cane sugar and lemon juice. The temperature of the syrup may range from say 150 to 175° F., a typical temperature being about 160° F. In the event it is desired to market the product in waterproof fiberboard containers, the prunes are placed in metal receptacles at 15, and are subsequently transferred to the fiberboard containers at or near the end of the equalization and cooling operation 17.

The syrup can be prepared by mixing commercial prune juice with a sugar syrup of suitable concentration, to which lemon juice has been added. A high quality commercial prune juice can be employed, such as a juice obtained from the water extraction of dried prunes. A suitable gravity is about 15° B. (Brix). Ordinary cane or beet sugar syrup can be employed, and the specific gravity can be about 15° B. In one particular instance the syrup was prepared as follows: Commercial prune juice at a specific gravity of 15° B. was mixed with cane sugar syrup likewise having a specific gravity of 15° B. The syrup contained 0.05% single strength lemon juice. The juice was mixed with the sugar syrup in the proportions of 30 parts prune juice to 70 parts sugar syrup. This provided a prune juice-sugar syrup having a specific gravity of about 15° B. This syrup was introduced into the containers in an amount equal to the weight of the prunes.

After adding the syrup to the container at 16, a time period of retention is provided as indicated at 17, during which time gradual cooling occurs. During retention at 17 there is a substantial increase in moisture and a substantial amount of sugar from the syrup penetrates the prunes, to effectively increase the sugar content of the flesh. This can be referred to as sugar equalization, and takes place without the use of additional heat. In addition to such sugar equalization there is some penetration of flavoring from the syrup into the flesh of the prunes, thereby compensating for any possible loss of flavor during previous processing, and in general giving the product a heightened flavor.

In practice retention at 17 can be continued for a period of about 23 to 25 hours. About 24 hours has been used in practice with good results.

In a typical operation and making use of the particular syrup mentioned above, at the end of 17½ hours retention the specific gravity of the syrup increased to about 30.5° B., after 21 hours it further increased to about 31° B., and after 24 hours it became equalized at about 31° B. It has been found that the drained weight of the prunes during operation 17 increased from 5 to 7 pounds for a 5 pound batch, and with 5 pounds of syrup being added at 16, the weight of the syrup in operation 17 decreased from 5 to 3 pounds. The moisture content of the prunes had increased to about 61% after 24 hours. It is desirable to carry out operation 17 in relatively shallow containers, as for example a container measuring about 4 inches in height.

After operation 17 the product is in condition for quick freezing at 18. This can be carried out by the use of conventional equipment for the quick freezing of food products. It is desirable to use quick freezing to temperatures of the order of −30° F. followed by storage at temperatures of the order of −10° F.

The product resulting from the above process has many desirable characteristics. When the contents of the container are permitted to thaw, the prunes are tender and can be consumed without further processing. The prunes have a heightened fruity flavor, without the characteristic flavor produced by caramelization of sugar. In fact the flavor and general quality of the product is excellent and superior to precooked prunes such as have been marketed in the past, either in packaged or canned form.

We attribute the superior flavor of our product to the novel features of our method. As previously mentioned caramelization of sugar is prevented by the use of temperatures throughout the process which are not in excess of about 200° F. The prunes are cooked in stages with gradual increase in moisture content to produce firm but tender flesh without rupture of the skin. During this cooking the desirable flavor characteristics of the prunes are largely retained. After the cooking operation 13 a substantial improvement in flavor occurs by virtue of operation 17, wherein sugar equalization occurs, together with a further increase in moisture content. After the special preparation of the prunes has been completed, freezing retains all of the desirable characteristics whereby no further change occurs until the product is thawed. The juice obtained upon thawing is clear and free from pulp or fragments of flesh, and likewise has an excellent flavor. No off flavor characteristics are acquired during storage, as is the case with canned prunes which tend to acquire an off flavor from contact with metal or metal coating materials.

We claim:

1. In a process for the preparation of frozen prunes, the steps of contacting cleaned and graded dried prunes with hot moisture saturated air to cook the flesh and to increase the moisture content, said operation being carried out in at least three stages, the air temperatures for the first, second and third stages corresponding substantially to 175 to 185, 185 to 193 and 193 to 200° F. respectively, the moisture content of the prunes leaving the last stage being from 32 to 35%, introducing the hot prunes from said operation into a container together with a hot syrup containing prune juice and sugar, retaining the prunes immersed in the syrup for a substantial time period to cause sugar equalization between the syrup and the prunes, with the prunes acquiring increased sugar content and moisture, and then freezing the entire mass.

2. In a process for the preparation of frozen prunes, the steps of contacting cleaned and graded dried prunes with hot moisture saturated air to cook the flesh and to increase the moisture content, increasing the temperature of the saturated air in successive stages during said last named operation to provide a final and maximum treatment temperature of the order of 193 to 200° F., introducing the prunes into a container together with a hot syrup containing prune juice and sugar, retaining the prunes immersed in the syrup for an extended time period within a temperature range below about 200° F. to cause sugar equalization between the syrup and the prunes, with the prunes acquiring increased sugar content and moisture from the syrup, and then freezing the entire mass.

3. In a process for the preparation of frozen prunes, the steps of contacting cleaned and graded dried prunes with hot moisture saturated air to cook the flesh and to increase the moisture content, said operation being in a plurality of stages with increased temperature for each successive stage, the final stage being carried out with the saturated air at a temperature of about 193 to 200° F., introducing the prunes into a container together with a hot syrup containing prune juice and sugar, retaining the prunes immersed in the syrup for a substantial time period to cause sugar equalization between the syrup and the prunes and during which period the prunes cool from a temperature not in excess of the temperature of the prunes leaving said final stage, with the prunes acquiring increased sugar content and moisture from the syrup, and then freezing the entire mass.

4. In a process for the preparation of frozen prunes, the steps of contacting cleaned and graded dried prunes with hot moisture saturated air to cook the flesh and to increase the moisture content, said operation being carried out in a plurality of stages with hot saturated air of increased temperature being used in each successive stage, the saturated air employed in the final stage being at a temperature of about 195° F. and said last stage being continued for a period of about 13 minutes to produce a final moisture content of about 33.2%, introducing the hot prunes into a container together with a hot syrup containing prune juice and sugar, retaining the prunes immersed in the syrup for a substantial time period within a temperature range below about 200° F. for sugar equalization between the syrup and the prunes, with the prunes acquiring increased sugar and moisture contents, and then freezing the entire mass.

5. In a process for the preparation of frozen prunes, the steps of contacting cleaned and graded dried prunes with hot moisture saturated air to cook the flesh and to increase the moisture content, said operation being carried out in a plurality of stages with the saturated air being at a higher temperature in each successive stage, the air in the final stage being at a temperature of the order of 193 to 200° F. and the prunes leaving the last stage having a moisture content of about 33.2%, introducing the resulting hot prunes into a container together with a hot syrup containing prune juice, sugar and lemon juice, said syrup having a specific gravity of about 15° B., retaining the prunes immersed in the syrup for a substantial time period to cause sugar equalization between the syrup and the prunes, with the prunes acquiring increased sugar content from the syrup, the syrup after said period of retention having a specific gravity of about 31° B., and then freezing the entire mass.

JAMES M. MILLS, Jr.
JAMES M. MILLS, III.

REFERENCES CITED

The following references are of record in the file of this patent:

UNITED STATES PATENTS

| Number | Name | Date |
| --- | --- | --- |
| 2,134,060 | Schaefle | Oct. 25, 1938 |
| 2,143,903 | Wilbur | Jan. 17, 1939 |